United States Patent
Itoh et al.

(10) Patent No.: US 12,198,537 B2
(45) Date of Patent: Jan. 14, 2025

(54) NOTIFICATION SYSTEM, VEHICLE TRANSPORTATION SYSTEM, AND COMPUTER PROGRAM

(71) Applicant: TOYOTA JIDOSHA KABUSHIKI KAISHA, Aichi-ken (JP)

(72) Inventors: Masayuki Itoh, Nagoya (JP); Iwao Maeda, Nagoya (JP); Tatsuya Sugano, Susono (JP); Norinao Watanabe, Susono (JP); Yutaka Nakamura, Susono (JP); Yoshikazu Jikuhara, Susono (JP); Yuki Nishikawa, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 42 days.

(21) Appl. No.: 18/177,083

(22) Filed: Mar. 1, 2023

(65) Prior Publication Data
US 2023/0351871 A1    Nov. 2, 2023

(30) Foreign Application Priority Data
Apr. 28, 2022   (JP) ................................. 2022-075282

(51) Int. Cl.
| | |
|---|---|
| *G08B 7/06* | (2006.01) |
| *B60P 3/07* | (2006.01) |
| *B66F 9/06* | (2006.01) |
| *G06Q 50/40* | (2024.01) |

(52) U.S. Cl.
CPC .................. *G08B 7/06* (2013.01); *B60P 3/07* (2013.01); *B66F 9/063* (2013.01); *G06Q 50/40* (2024.01)

(58) Field of Classification Search
CPC ... G08B 7/06; G08B 21/24; B60P 3/07; B66F 9/063; B66F 9/0755; B66F 9/24; G06Q 50/40; G08G 1/123
See application file for complete search history.

(56) References Cited

U.S. PATENT DOCUMENTS

| | | | |
|---|---|---|---|
| 2010/0161128 A1* | 6/2010 | Choi | E04H 6/422 901/1 |
| 2010/0183409 A1* | 7/2010 | Checketts | E04H 6/245 414/281 |
| 2015/0167340 A1* | 6/2015 | Niizuma | B60L 53/126 414/231 |
| 2016/0012730 A1* | 1/2016 | Jarrell | G08G 5/0091 701/4 |
| 2016/0115702 A1* | 4/2016 | Nordbruch | G05D 1/0055 414/231 |
| 2017/0116790 A1* | 4/2017 | Kusens | G08G 1/146 |
| 2017/0283171 A1* | 10/2017 | High | B65G 1/0492 |
| 2018/0053141 A1* | 2/2018 | Shydo, Jr. | G05D 1/104 |
| 2018/0072345 A1* | 3/2018 | Nicodemus | G05D 1/0088 |

(Continued)

FOREIGN PATENT DOCUMENTS

JP     2018204373 A     12/2018

*Primary Examiner* — Ryan W Sherwin
(74) *Attorney, Agent, or Firm* — HAUPTMAN HAM, LLP (57) ABSTRACT

The notification system is configured to be capable of communicating with the outside, and is configured to notify the surroundings of the fact that the conveyance work is performed by a third party who has obtained permission when the vehicle is conveyed by the vehicle transportation device capable of autonomous traveling based on a notification instruction from the outside.

6 Claims, 9 Drawing Sheets

(56) References Cited

U.S. PATENT DOCUMENTS

| | | | |
|---|---|---|---|
| 2018/0170365 A1* | 6/2018 | Shani | G05D 1/0282 |
| 2019/0193724 A1* | 6/2019 | Kim | G06V 20/54 |
| 2019/0227571 A1* | 7/2019 | Ito | G05D 1/0282 |
| 2020/0183421 A1* | 6/2020 | Schütz | B60L 50/50 |
| 2020/0377299 A1* | 12/2020 | Sun | B25J 9/1679 |
| 2021/0101789 A1* | 4/2021 | Roethling | B66F 17/003 |
| 2022/0073330 A1* | 3/2022 | Cord | B66F 9/0754 |
| 2022/0144609 A1* | 5/2022 | Yamamoto | G05D 1/667 |

* cited by examiner

NOTIFICATION SYSTEM, VEHICLE TRANSPORTATION SYSTEM, AND COMPUTER PROGRAM

CROSS-REFERENCE TO RELATED APPLICATION

This application claims priority to Japanese Patent Application No. 2022-075282 filed on Apr. 28, 2022, incorporated herein by reference in its entirety.

BACKGROUND

1. Technical Field

The present disclosure relates to a notification system, a vehicle transportation system, and a computer program.

2. Description of Related Art

Japanese Unexamined Patent Application Publication No. 2018-204373 (JP 2018-204373 A) discloses a technique in which, in a parking lot available to autonomous driving vehicles and non-autonomous driving vehicles, the non-autonomous driving vehicles are transported from the entrance/exit unit to the parking location by a self-propelled vehicle transportation device.

SUMMARY

In the case of providing vehicle transportation services using an autonomously traveling vehicle transportation device, first, an unmanned vehicle parked in a certain location is lifted up by the vehicle transportation device. Next, the vehicle transportation device transports the unmanned vehicle to another location. Therefore, for example, in a parking lot without restrictions on entry of persons, if the vehicle transportation device abruptly starts the transportation work of the vehicle (particularly the lift-up work), this may surprise or cause a feeling of strangeness to surrounding persons because the movement of the vehicle transportation device cannot be predicted.

The present disclosure provides a technique that does not surprise surrounding persons or cause a feeling of strangeness to the surrounding persons during transportation work of a vehicle by a vehicle transportation device.

A notification system communicable with an outside according to an aspect of the present disclosure includes a notification device configured to, based on a notification instruction from the outside, notify surroundings that a transportation work of a vehicle is performed by a third party who has obtained permission, when the transportation work is performed by a vehicle transportation device able to perform autonomous traveling.

A vehicle transportation system according to an aspect of the present disclosure includes: a terminal associated with a vehicle; a vehicle transportation device that transports the vehicle by autonomous traveling; a notification system that performs notification to surroundings; and a server configured to communicate with each of the terminal, the vehicle transportation device, and the notification system, and transmit a notification instruction signal to the notification system when the server receives, from the vehicle transportation device, a transportation preparation completion signal indicating that preparation for starting a transportation work of the vehicle is completed. The notification instruction signal is a signal for instructing to notify the surroundings that the transportation work of the vehicle by the vehicle transportation device is performed by a third party who has obtained permission.

A computer program according to an aspect of the present disclosure and for controlling a notification system able to communicate with an outside and perform notification to surroundings causes, based on a notification instruction from the outside, the notification system to notify the surroundings that a transportation work of a vehicle is performed by a third party who has obtained permission, when the transportation work is performed by a vehicle transportation device able to perform autonomous traveling.

A notification method performed by a notification system communicable with an outside includes notifying, based on a notification instruction from the outside, surroundings that a transportation work of a vehicle is performed by a third party who has obtained permission, when the transportation work is performed by a vehicle transportation device able to perform autonomous traveling.

According to these aspects of the present disclosure, since it is notified to the surroundings that the transportation work of the vehicle is performed by a third party who has obtained permission during the transportation work by the vehicle transportation device, it is possible to suppress surprising surrounding persons or causing a feeling of strangeness to the surrounding persons by the transportation work.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments will be described in detail with reference to the drawings. In the following description, similar components are given the same reference numbers.

Figure 1:
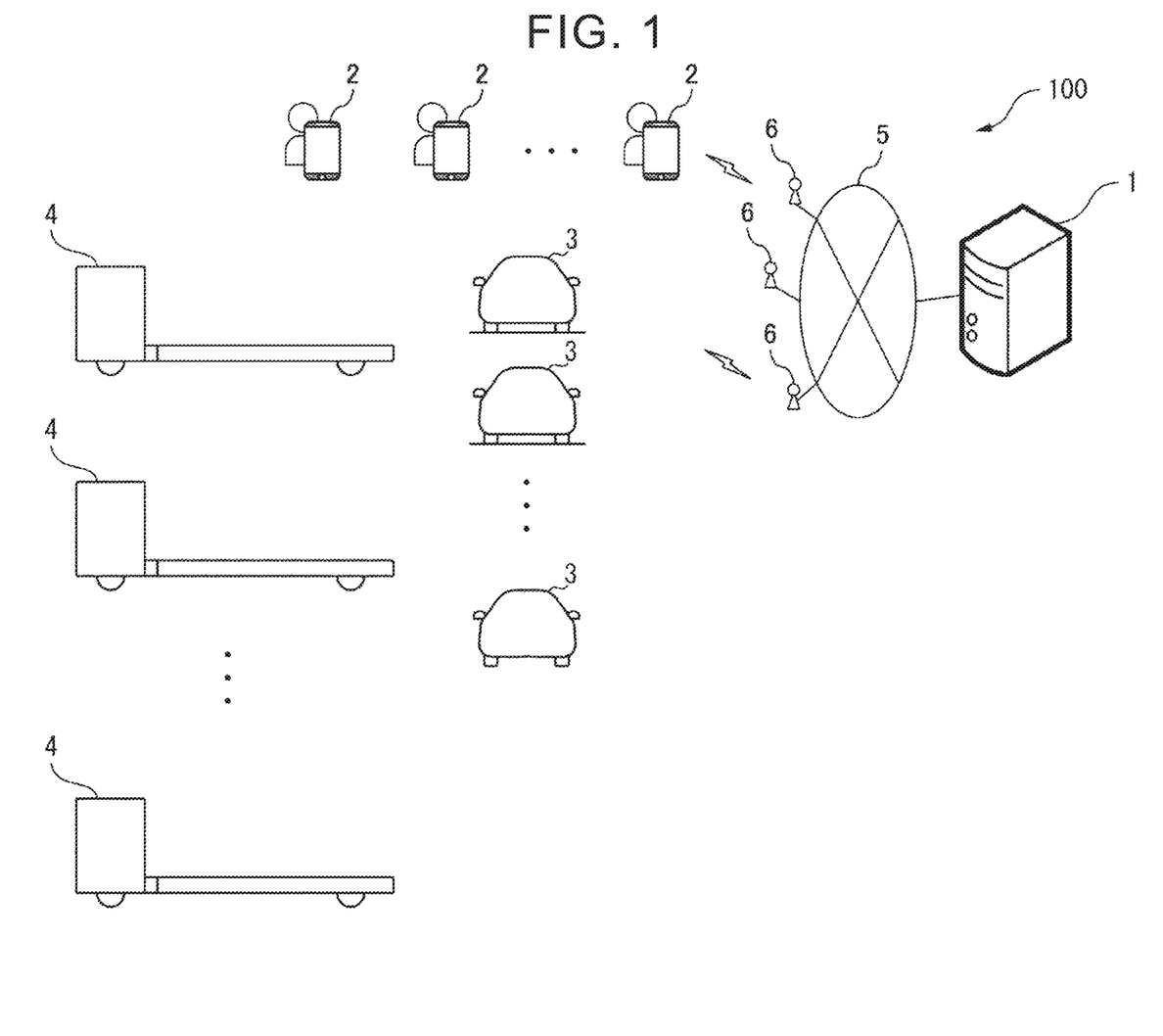
FIG. 1 is a schematic configuration diagram of a vehicle transportation system according to an embodiment of the present disclosure.

FIG. 1 is a schematic configuration diagram of a vehicle transportation system 100 according to an embodiment of the present disclosure.

As illustrated in FIG. 1, the vehicle transportation system 100 includes a server 1, terminals 2 of each user who uses the vehicle transportation service, vehicles 3 associated with the terminals 2, and a self-propelled vehicle transportation device 4. The vehicle conveyance service will be described later with reference to FIG. 2.

The server 1, the terminal 2, the vehicle 3, and the vehicle transportation device 4 can communicate with each other via the network 5. The network 5 is constituted by an optical communication line or the like. The server 1 is connected to the network 5 via, for example, a gateway (not shown) or the like. The terminal 2, the vehicle 3, and the vehicle transportation device 4 are connected to the network 5 via, for example, the wireless base station 6.

Figure 2:
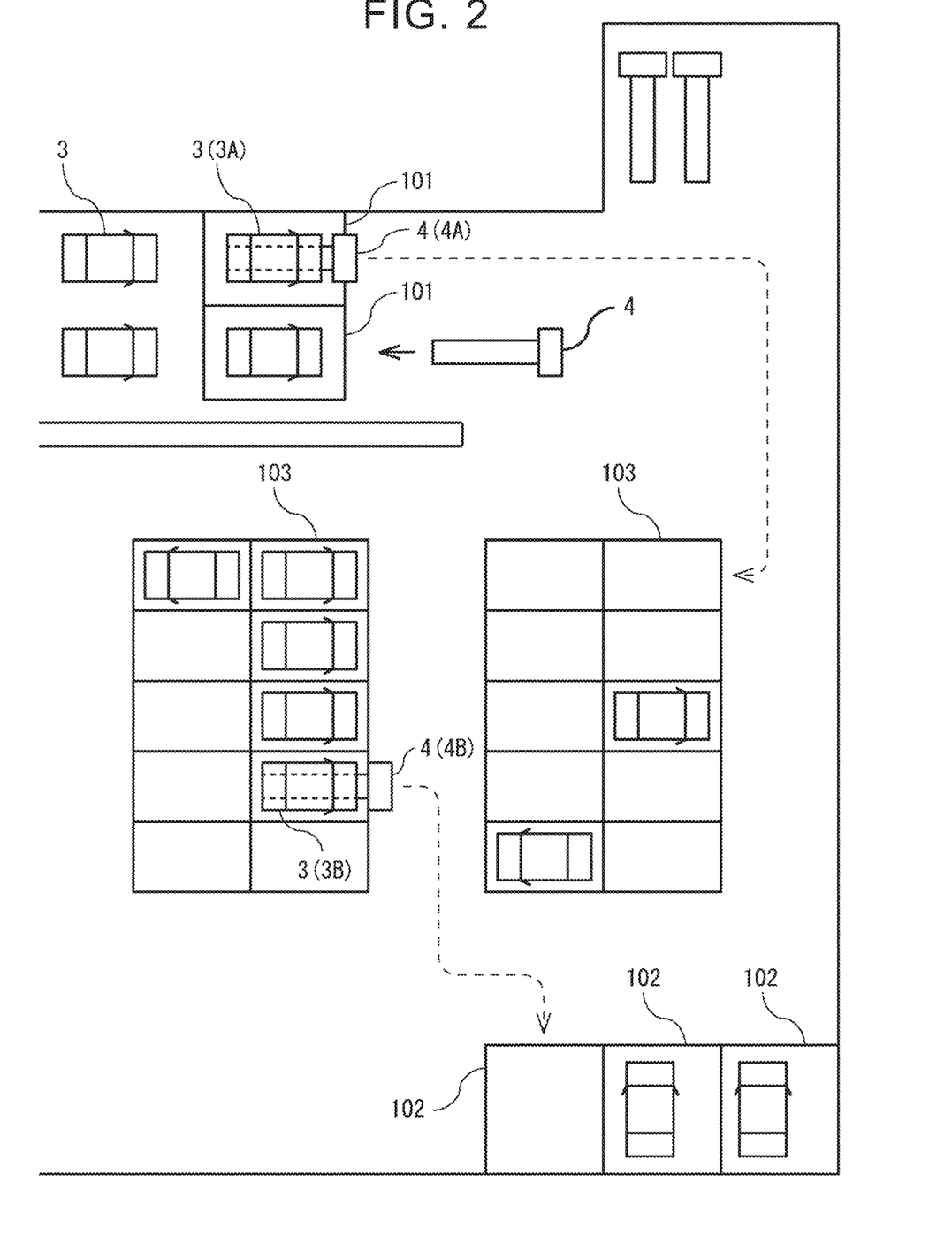
FIG. 2 is a diagram illustrating an example of a vehicle transportation service provided by a vehicle transport system.

FIG. 2 is a diagram illustrating an example of a vehicle transportation service provided by the vehicle transportation system 100.

As shown in FIG. 2, the vehicle transportation system 100 provides a vehicle transport service. The vehicle transportation system 100 automatically lifts up the vehicle 3A of the service user parked in the predetermined warehousing space 101 to the vehicle transportation device 4A based on a warehousing request from the user of the vehicle transportation service (hereinafter referred to as "service user"). The vehicle transportation device 4A is transported to an empty parking space 103. Further, the vehicle transportation system 100 automatically lifts up the vehicle 3B of the service user parked in the parking space 103 to the vehicle transportation device 4B based on the delivery request from the service user. The vehicle transportation device 4B is transported to a predetermined delivery space 102.

Parking space 103, for example, accommodation and commercial facilities, public facilities, passenger facilities, parking space in the parking lot installed in each facility such as a medical facility. The warehousing space 101 and the delivery space 102 are, for example, delivery locations of vehicles installed at entrances and exits of a parking lot, entrances of respective facilities, and the like. The warehousing space 101 and the delivery space 102 may be appropriately installed in an appropriate place for providing the vehicle conveyance service.

Here, when the vehicle transportation system 100 provides such a vehicle transportation service, the vehicle transportation device 4 needs to lift up the vehicle 3 of each service user in the unmanned state parked in the warehousing space 101 or the parking space 103 and transport the vehicle 3 to another place. For this reason, for example, in a parking lot in which the entry of a person is not restricted, there is a case where the transportation work (in particular, the lift-up work) of the vehicle 3 by the vehicle transportation device 4 is abruptly started. In this case, there is a possibility that a surrounding person cannot predict the movement of the vehicle transportation device 4 and is surprised. In addition, the transportation work of the vehicle 3 by the vehicle transportation device 4 may be performed by a malicious third party such as a vehicle theft. It is difficult for the surrounding person to determine whether the conveyance work is a work performed by a third party with permission from the owner of the vehicle 3 or a work performed by a malicious third party.

Therefore, in the present embodiment, a notification system 30 (see FIG. 5), which will be described later, is mounted on the vehicle 3. At the time of the conveyance work by the vehicle transportation device 4, the notification system 30 can notify the surroundings (a person outside the vehicle) that the conveyance work for the host vehicle is performed by a third party who has obtained permission. Hereinafter, the server 1, the terminal 2, the vehicle 3 (notification system 30), and the vehicle transportation device 4 will be described in detail with reference to FIGS. 3 to 8. Next, an example of the vehicle conveyance processing according to the present embodiment will be described with reference to FIG. 9. The vehicle conveyance processing is performed in the server 1, the terminal 2, the vehicle 3 (notification system 30), and the vehicle transportation device 4 in order to provide the vehicle conveyance service.

Figure 3:
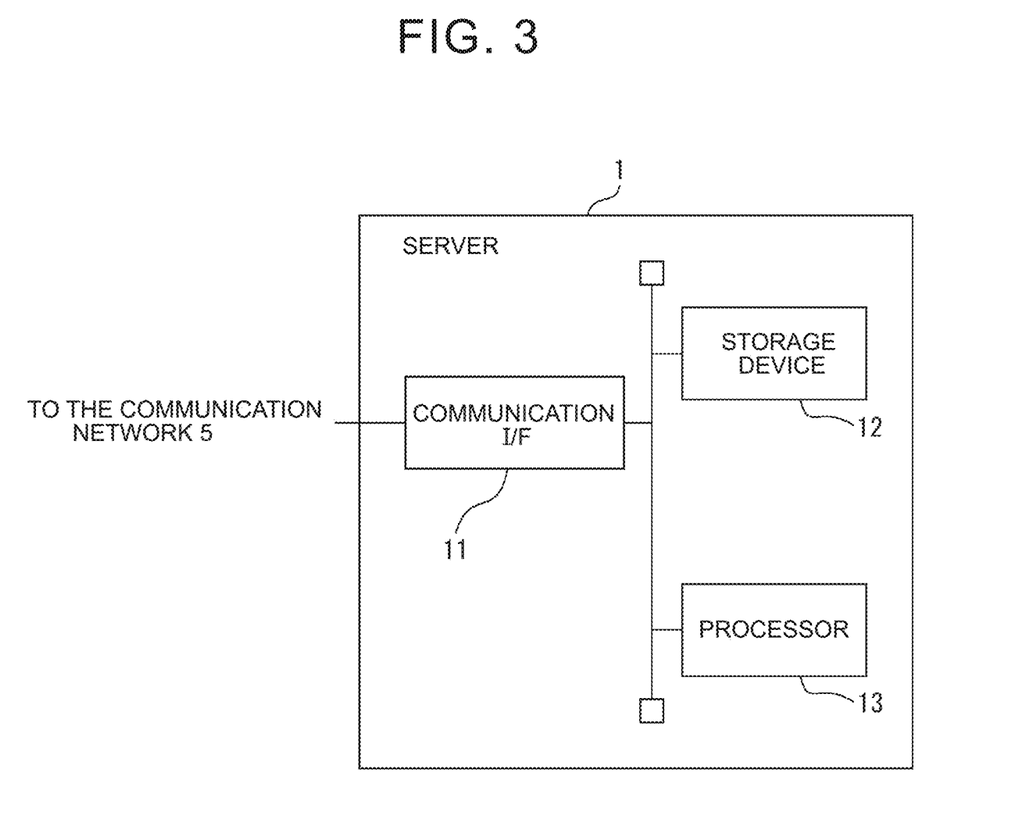
FIG. 3 is a schematic configuration diagram of a server according to an embodiment of the present disclosure.

FIG. 3 is a schematic configuration diagram of the server 1.

The server 1 includes a communication interface (a communication I/F) 11, a storage device 12, and a processor 13).

The communication interface 11 has an interface circuit for connecting the server 1 to the network 5 (see FIG. 1). The server 1 communicates with each of the terminal 2, the vehicle 3, and the vehicle transportation device 4 via the communication interface 11 and the network 5.

The storage device 12 includes a storage medium such as a Hard Disk Drive (HDD), Solid State Drive (SSD), an optical recording medium, and a semiconductor memory. The storage device 12 stores various computer programs executed by the processor 13. The storage device 12 stores various types of data used when the computer program is executed.

In the present embodiment, the storage device 12 stores, as data used when the computer program is executed, for example, identification information of each terminal 2, identification information and current position information of the vehicle 3 associated with each terminal 2, identification information and current position information of each vehicle transportation device 4, and the like. For example, the identification information of the terminals 2 may be MAC addresses. The identification information of each vehicle 3 can be, for example, the vehicle number of each vehicle 3. The identification information of each vehicle transportation device 4 can be, for example, a vehicle number or a cart number of each vehicle transportation device 4.

The processor 13 includes one or more Central Processing Unit (CPU) and peripheral circuitry thereof. The processor may further include other arithmetic circuits such as a logical arithmetic unit and a numerical arithmetic unit. The processor executes various computer programs stored in the storage device 12. The processor 13 performs, for example, a process related to the server 1 in the vehicle conveyance process.

Figure 4:
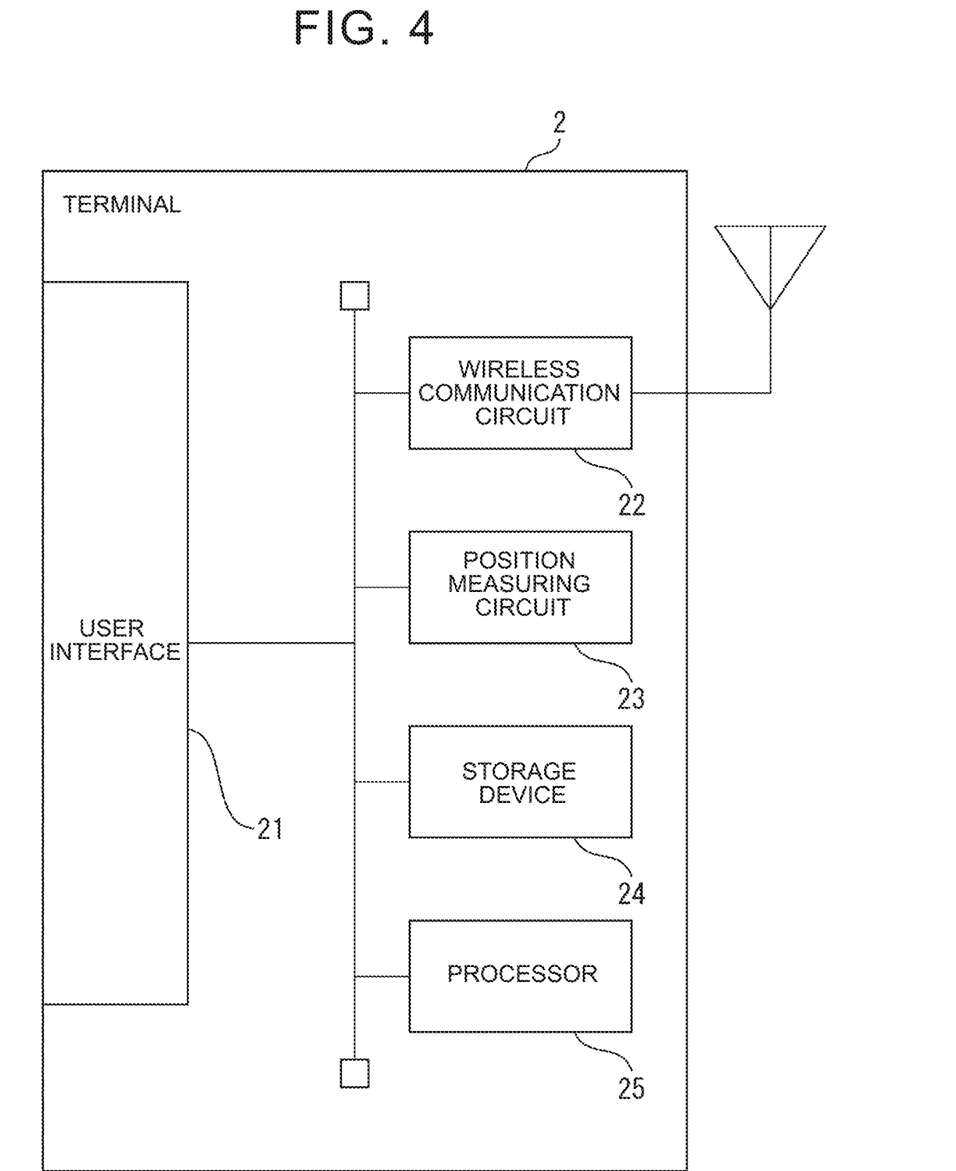
FIG. 4 is a schematic configuration diagram of a terminal according to an embodiment of the present disclosure.

FIG. 4 is a schematic configuration diagram of the terminal 2.

The terminal 2 is, for example, a mobile terminal such as a mobile phone or a tablet computer, or an in-vehicle terminal such as a navigation system. The terminal 2 includes a user interface 21, a wireless communication circuit 22, a position measurement circuit 23, a storage device 24, and a processor 25. By operating the terminal 2, the service user can make a warehousing request and a warehousing request for the vehicle 3 to the server 1. Note that each terminal 2 may be a device of the same type. Each terminal 2 may be a different type of device.

The user interface 21 is, for example, a touch panel display. The user interface 21 generates a signal corresponding to various operations performed by a user (service user). The user interface 21 outputs the signal to the processor 25. The user interface 21 also displays various types of display information received from the processor 25.

The wireless communication circuit 22 includes, for example, an antenna and a signal processing circuit. The signal processing circuit performs various processes related to wireless communication such as modulation and demodulation of a wireless signal. The wireless communication circuit 22 receives a downlink wireless signal from the wireless base station 6. Further, the wireless communication circuit 22 transmits an uplink wireless signal to the wireless base station 6. That is, the wireless communication circuit 22 extracts a signal transmitted from the server 1 to the terminal 2 from the downlink wireless signal received from the wireless base station 6. The wireless communication circuit 22 passes the retrieved signal to the processor 25. Also, the wireless communication circuit 22 generates an uplink wireless signal and transmits the wireless signal. The uplink radio signal includes a signal received from the processor 25 and transmitted to the server 1.

The position measurement circuit 23 acquires information indicating the position of the terminal 2. The position measurement circuit 23 includes, for example, a receiver that receives a Global Navigation Satellite System (GNSS) signal and an arithmetic circuit that calculates the position of the terminal 2 from GNSS signal. The position measurement circuit 23 measures the position of the terminal 2 based on GNSS. Each time the position of the terminal 2 is measured, the position measurement circuit 23 notifies the processor 25 of the position.

The storage device 24 includes, for example, a readable/writable non-volatile semiconductor memory and a readable/writable volatile semiconductor memory. The storage device 24 stores various application programs executed on the processor 25 and various kinds of data.

The processor 25 includes one or more CPU and peripheral circuitry thereof. The processor 25 may further include other arithmetic circuits such as a logical arithmetic unit and a numerical arithmetic unit. The processor 25 executes various application programs stored in the storage device 24. The processor 25 performs, for example, a process related to the terminal 2 in the vehicle conveyance process.

Figure 5:
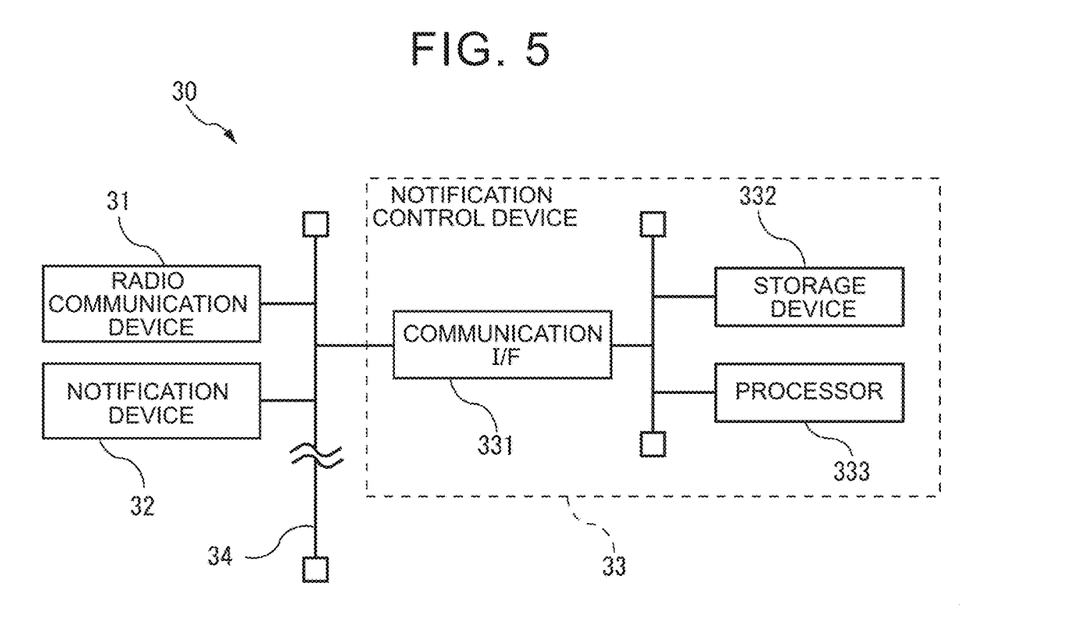
FIG. 5 is a schematic configuration diagram of a notification system according to an embodiment of the present disclosure.

FIG. 5 is a schematic configuration diagram of the notification system 30 mounted on the vehicle 3.

The notification system 30 includes a wireless communication device 31, a notification device 32, and a notification control device 33. The wireless communication device 31 and the notification device 32 are connected to the notification control device 33 via a network 34 in the vehicle 3. The network 34 complies with standards such as CAN.

The wireless communication device 31 is an in-vehicle terminal having a wireless communication function. The wireless communication device 31 accesses, for example, the wireless base station 6 (see FIG. 1) connected to the network 5 (see FIG. 1) via a gateway (not shown) or the like. Thus, the wireless communication device 31 is connected to the network 5 via the wireless base station 6. As a result, communication is performed between the vehicle 3 and the server 1.

At the time of the conveyance operation by the vehicle transportation device 4, the notification device 32 notifies the surroundings (a person outside the vehicle) that the host vehicle is the conveyance target vehicle (that is, agrees to be conveyed by the vehicle transportation device 4) by, for example, light, sound, an image, or a combination thereof. The type of the notification device 32 is not particularly limited as long as such notification can be performed. The notification device 32 may be, for example, an outside speaker capable of making various announcements by voice toward the outside of the vehicle, an outside display capable of displaying character information, image information, or the like toward the outside of the vehicle, or a lamp. The lamp may be a dedicated lamp, or may be a lamp conventionally installed in the vehicle 3, such as a headlight or a winker. Note that the "conveyance operation" may include, for example, operations at each stage for vehicle conveyance, such as before, during, or during the insertion of the carriage unit 42 into the vehicle lower portion, before the start of the lift-up operation, during the lift-up operation, during the movement after the lift-up operation, and during the lift-down operation.

The notification control device 33 includes a communication interface 331, a storage device 332, and a processor 333.

The communication interface 331 includes an interface circuit for connecting the notification control device 33 to the network 34 in the vehicle 3. That is, the communication interface 331 is connected to the wireless communication device 31 and the notification device 32 via the network 34 in the vehicle 3.

The storage device 332 includes, for example, a readable/writable non-volatile semiconductor memory and a readable/writable volatile semiconductor memory.

The storage device 332 stores various computer programs executed on the processor 333 and various kinds of data.

The processor 333 includes one or more CPU and peripheral circuitry thereof. The processor may further include other arithmetic circuits such as a logical arithmetic unit and a numerical arithmetic unit. The processor 333 executes various computer programs stored in the storage device 332. The processor 333 performs, for example, a process related to the notification system 30 among the vehicle conveyance processes.

Next, the vehicle transportation device 4 will be described in detail with reference to FIG. 6 to FIG. 8.

Figure 6:
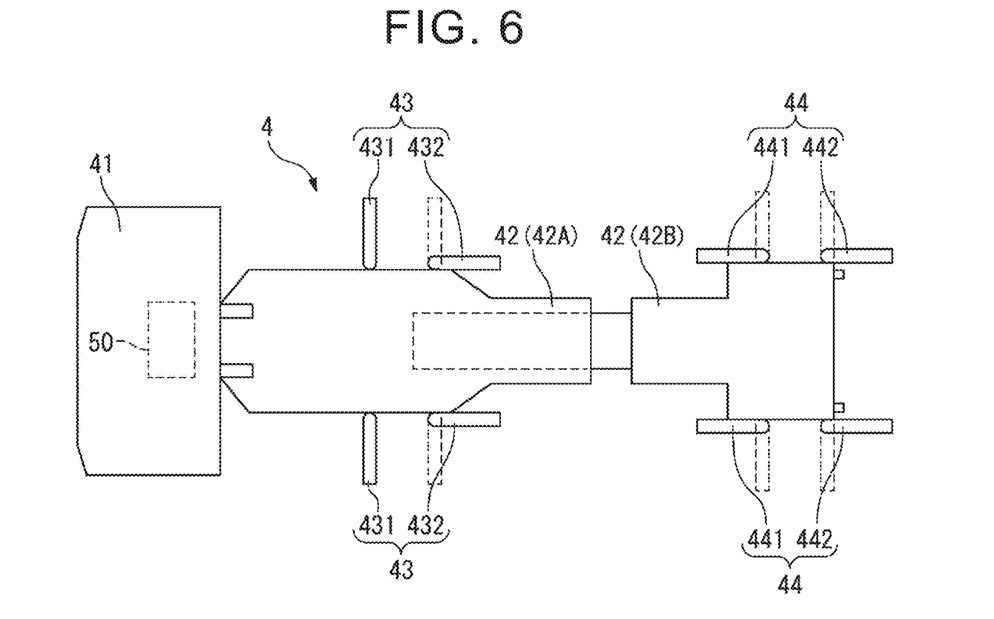
FIG. 6 is a schematic top view of a vehicle transportation device according to an embodiment of the present disclosure.

FIG. 6 is a schematic top view of the vehicle transportation device 4. FIG. 7A is a schematic side view of a vehicle transportation device in a state in which the carriage unit 42 of the vehicle transportation device 4 is not lifted up (hereinafter, referred to as a "non-lifted up state"). FIG. 7B is a schematic side view of a vehicle transportation device 4 in a state in which a carriage unit 42 of the vehicle transportation device 4 is lifted up (hereinafter referred to as a "lifted up state").

Figure 7A:
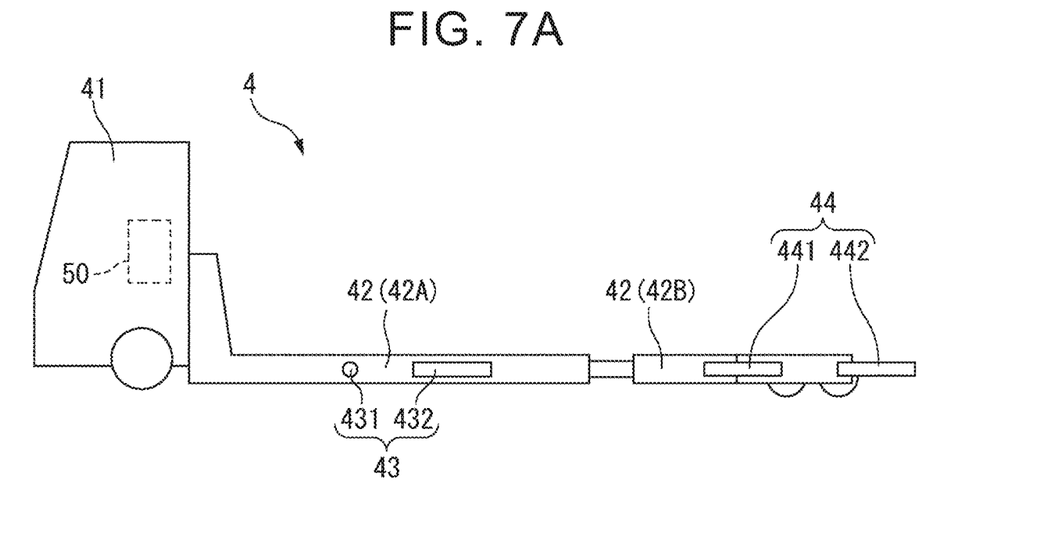
FIG. 7A is a schematic side view of a vehicle transportation device in which a carriage unit is not lifted up.
Figure 7B:
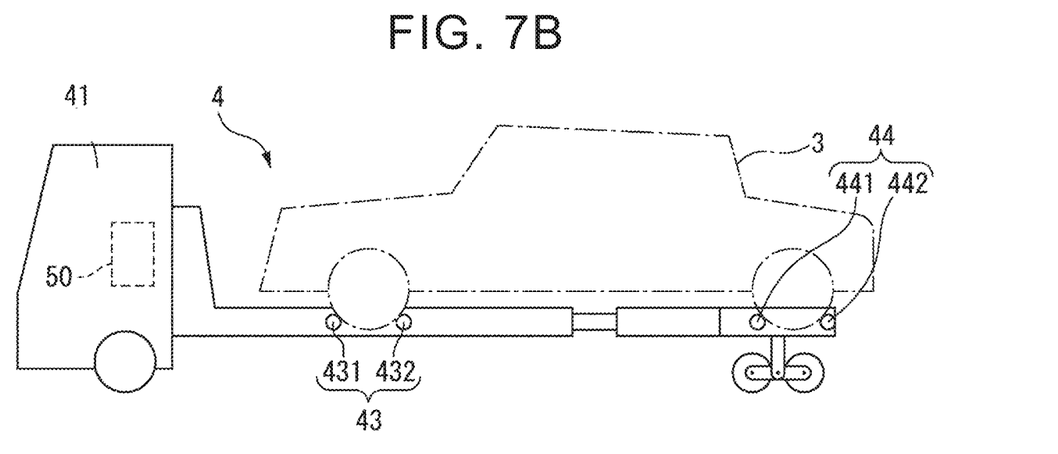
FIG. 7B is a schematic side view of a vehicle transportation device with a carriage lifted up.

As illustrated in FIGS. 6 to 7B, the vehicle transportation device 4 includes a traction unit 41 that autonomously travels and a carriage unit 42 that is towed by the traction unit and supports the vehicle 3.

An autonomous traveling system 50 is mounted on the traction unit 41. By the autonomous traveling system 50, the driving operation related to acceleration, steering, and braking and the conveyance work of the vehicle 3 are automatically performed. The autonomous traveling system 50 will be described in detail later with reference to FIG. 8.

The carriage unit 42 is vertically moved up and down with respect to the traction unit 41 by an elevating actuator (not shown). That is, the carriage unit 42 is configured to be able to switch between the non-lift-up state and the lift-up state. The type and structure of the elevating actuator are not particularly limited as long as they can perform a desired function. The lift actuator may be, for example, an electric, hydraulic or pneumatic linear actuator.

The carriage unit 42 includes a first carriage unit 42A on the traction unit 41 side and a second carriage unit 42B. The second carriage unit 42B is configured to be extendable and retractable in the front-rear direction of the carriage unit 42 with respect to the first carriage unit 42A by an extendable actuator (not shown). The first carriage unit 42A is provided with a first wheel support arm 43 that supports one of the front wheels or the rear wheels of the vehicle 3. The second carriage unit 42B is provided with a second wheel support arm 44 that supports the other of the front wheels or the rear wheels of the vehicle.

The first wheel support arm 43 includes a fixed arm 431 extending in the left-right direction of the carriage unit 42 and a movable arm 432. The movable arm 432 can be rotated between a storage position indicated by a solid line in FIG. 6 and a development position indicated by a broken line by a rotation actuator (not shown). The second wheel support arm 44 includes a pair of movable arms 441,442. The movable arm 441,442 can be rotated between a storage position indicated by a solid line in FIG. 6 and a deployed position indicated by a broken line by a rotation actuator (not shown). The type and structure of the extendable actuator and the rotation actuator are not particularly limited as long as desired functions can be exhibited.

When the vehicle 3 is lifted up, the carriage unit 42 is inserted into a space between the bottom surface of the vehicle 3 and the ground from the front side or the rear side of the vehicle 3 in a non-lifted state. Then, the second carriage unit 42B is expanded and contracted in accordance with the wheel base of the vehicle 3. Next, the movable arm 432,441,442 of each of the first wheel support arm 43 and the second wheel support arm 44 is rotated to the deployed position. After the first wheel support arm 43 and the second wheel support arm 44 respectively sandwich the front wheel and the rear wheel of the vehicle 3, they are switched to the lift-up state. The carriage unit 42 supports the vehicle 3.

Figure 8:
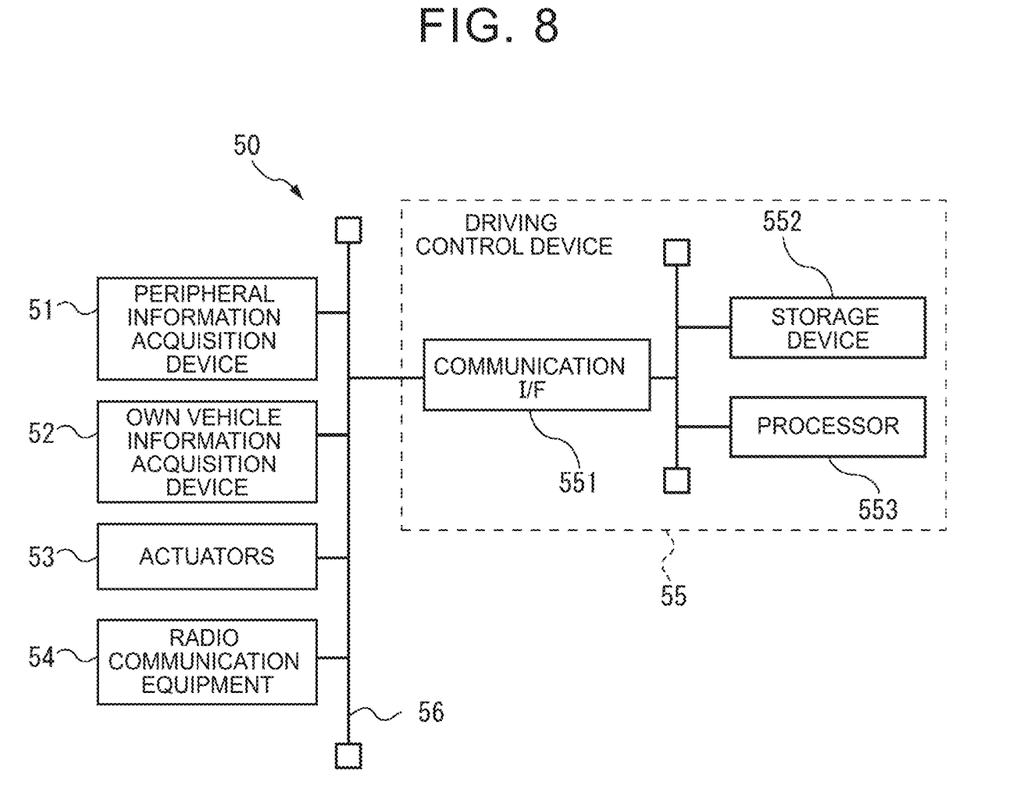
FIG. 8 is a schematic configuration diagram of an autonomous traveling system mounted on a vehicle transportation device.

FIG. 8 is a schematic configuration diagram of an autonomous traveling system 50 mounted on the vehicle transportation device 4.

The autonomous traveling system 50 includes a peripheral information acquisition device 51, a host vehicle information acquisition device 52, various actuators 53, a wireless communication device 54, and a driving control device 55. The peripheral information acquisition device 51, the own vehicle information acquisition device 52, the various actuators 53, and the wireless communication device 54 are connected to the driving control device 55 via a network 56 in the vehicle transportation device 4 conforming to standards such as CAN.

The peripheral information acquisition device 51 acquires, as peripheral information of the vehicle transportation device 4, data of an object around the vehicle transportation device 4 (for example, a surrounding vehicle including a conveyance target vehicle, a pedestrian, a road, an obstacle such as a building, and the like). Examples of the peripheral-information acquiring device 51 include a camera that photographs an object around the vehicle transportation device, a Light Detection And Ranging (LiDAR that measures a distance to an object around the vehicle transportation device, and a ranging sensor such as a millimeter-wave radar sensor. The peripheral information acquisition device 51 is not limited to these devices, and may be constituted by a plurality of devices such as a camera and a ranging sensor. The peripheral information of the vehicle transportation device 4 acquired by the peripheral information acquisition device 51 is transmitted to the driving control device 55.

The own vehicle information acquisition device 52 acquires various types of data related to the state of the vehicle transportation device 4 as the own-vehicle information of the vehicle transportation device 4. The own vehicle information acquisition device 52 according to the present embodiment includes various sensors for detecting the speed, acceleration, posture, and the like of the vehicle transportation device 4, various sensors for detecting the state of the carriage unit 42 (the elevating state of the carriage unit 42, the positions of the wheel support arms 43 and 44, and the like), a GNSS receiver for detecting the present position of the vehicle transportation device 4, and the like. The host vehicle information of the vehicle transportation device 4 acquired by the own vehicle information acquisition device 52 is transmitted to the driving control device 55.

The various actuators 53 are actuators whose operation is controlled by the driving control device 55. The actuators 53 are, for example, a drive actuator such as an engine or a motor for generating power for driving the traction unit 41, a steering actuator for controlling a traveling direction of the traction unit 41, a braking actuator for braking the traction unit 41, the above-described elevating actuator for performing elevating and lowering control of the carriage unit 42, and an actuator such as the above-described telescopic actuator for performing telescopic control of the carriage unit 42.

The wireless communication device 54 has a wireless communication function. The wireless communication device 54 accesses, for example, the wireless base station 6 connected to the network 5 via a gateway (not shown) or the like. Accordingly, the wireless communication device 54 is configured to be connected to the network 5 via the wireless base station 6. As a result, communication is performed between the vehicle transportation device 4 and the server 1.

The driving control device 55 includes a communication interface 551, a storage device 552, and a processor 553.

The communication interface 551 includes an interface circuit for connecting the driving control device 55 to the network 56 in the vehicle transportation device 4. That is, the communication interface 551 is connected to the peripheral information acquisition device 51 and the like via the network 56 in the vehicle transportation device 4.

The storage device 552 includes a storage medium such as a HDD, a SSD, an optical recording medium, and a semiconductor memory. The storage device stores various computer programs executed by the processor 553. The storage device 552 stores various types of data used when the computer program is executed. Further, the storage device 552 stores detailed map information of an area in which the vehicle transportation device 4 is used.

The processor 553 includes one or more Central Processing Unit (CPU) and peripheral circuitry thereof. The processor 553 may further include other arithmetic circuits such as a logical arithmetic unit and a numerical arithmetic unit. The processor 553 executes various computer programs stored in the storage device 552. The processor 553 comprehensively controls the overall operation of the vehicle transportation device 4. For example, the processor 553 controls various types of actuators 53 on the basis of peripheral information, host vehicle information, map information, and the like of the vehicle transportation device 4. Thus, the driving operation of the vehicle transportation device 4 and the conveyance work of the vehicle 3 are automatically performed. The processor 553 performs, for example, a process related to the vehicle transportation device 4 in the vehicle conveyance process.

Figure 9:
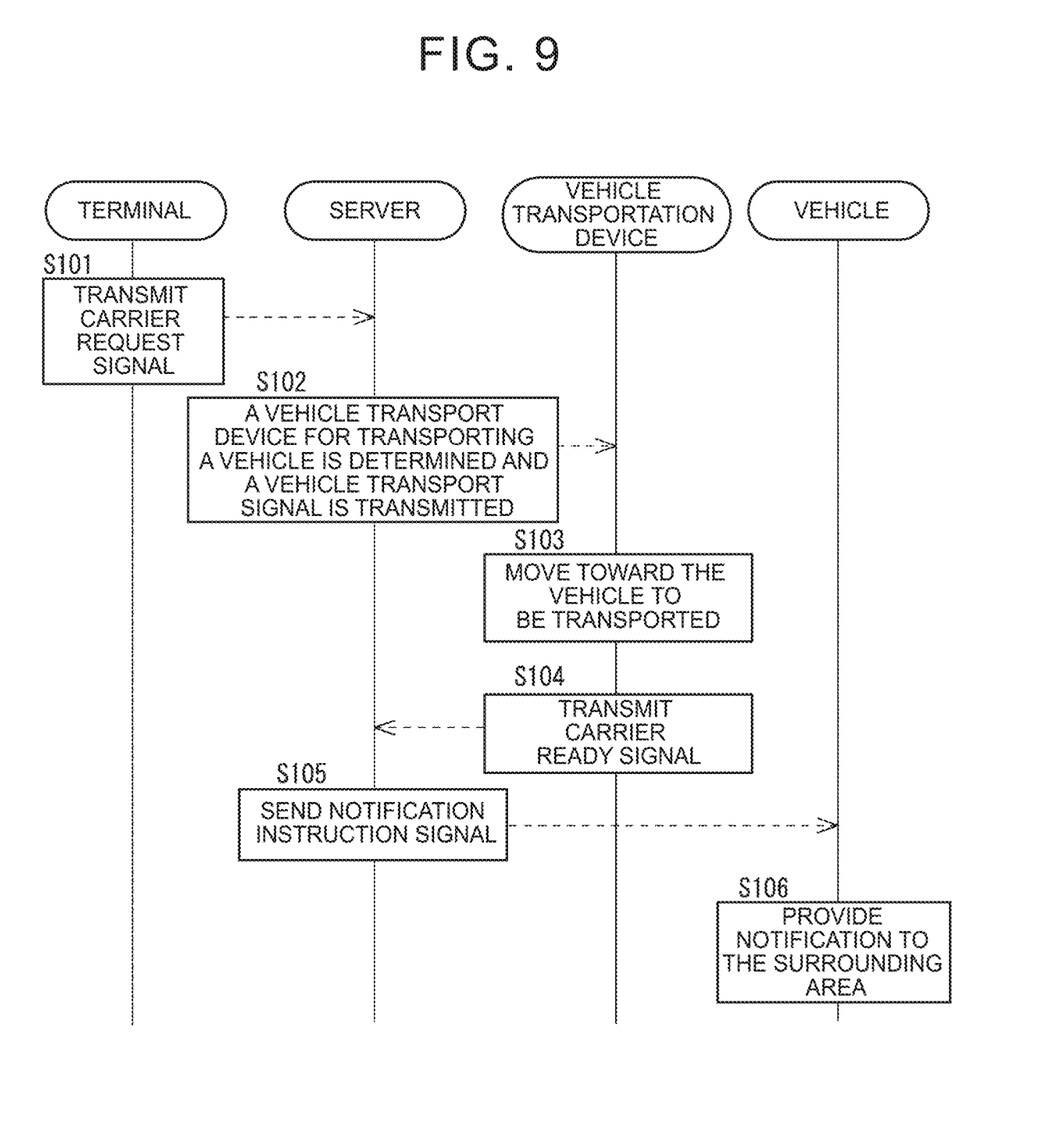
FIG. 9 is an operation sequence diagram for explaining the details of a process performed at the time of transporting a vehicle according to an embodiment of the present disclosure, which is performed in a server, a terminal, a vehicle (notification system), and a vehicle transportation device.

FIG. 9 is an operation sequence diagram for explaining the contents of a vehicle transport process (computer program) according to the present embodiment in order to provide a vehicle transport service. The vehicle conveyance processing is performed in the server 1, the terminal 2, the vehicle 3 (more specifically, the notification system 30 mounted on the vehicle 3), and the vehicle transportation device 4.

In the step S101, when a transportation request (a warehousing request or a warehousing request) for the vehicle 3 is made by the service user via the user interface 21, the terminal 2 transmits a transportation request signal to the server 1 to notify that the transportation request for the vehicle 3 has been made.

The conveyance request signal includes, for example, identification information of the terminal 2 (hereinafter referred to as "transmission source terminal 2") that is a transmission source of the signal, identification information of the vehicle 3 associated with the transmission source terminal 2, that is, the vehicle 3 to be conveyed (hereinafter referred to as "conveyance target vehicle 3"), and current position information. The identification information and the current position information of the conveyance target vehicle are input by the service user via the user interface 21, for example, when the service user requests the conveyance of the vehicle 3.

In the step S102, when the conveyance request signal is received, the server 1 determines the vehicle transportation device 4 that performs the vehicle conveyance on the basis of, for example, the current position information of the conveyance target vehicle 3 and the current position information and the usage status of the vehicle transportation device 4. The server 1 transmits a vehicle conveyance signal to the vehicle transportation device 4. The vehicle conveyance signal includes, for example, identification information and current position information of the conveyance target vehicle 3. It is assumed that the vehicle transportation device 4 periodically transmits the current position information and the usage status of the own device to the server 1.

In the step S103, when the vehicle conveyance signal is received, the vehicle transportation device 4 starts moving toward the stop position of the conveyance target vehicle 3 based on the present position information of the conveyance target vehicle 3.

In the step S104, when the vehicle transportation device 4 arrives at the stop position of the conveyance target vehicle 3 and the conveyance target vehicle 3 is recognized by, for example, the peripheral information acquisition device 51, the vehicle transportation device 4 transmits, to the server 1, a conveyance preparation completion signal indicating that the preparation for starting the conveyance work of the conveyance target vehicle 3 has been completed. The conveyance preparation completion signal includes, for example, identification information of the conveyance target vehicle 3.

In S105 of steps, when the server 1 receives the conveyance ready signal, the server 1 transmits a notification instruction signal to the conveyance target vehicles 3.

In the step S106, when the vehicle 3 (more specifically, the notification system 30 mounted on the vehicle 3) receives the notification instruction signal, the vehicle 3 notifies the surroundings (a person outside the vehicle) of the fact that the conveyance operation for the host vehicle is performed by a third party who is permitted by the notification device 32.

In the present embodiment, as illustrated in FIG. 9, the server 1 that has received the conveyance preparation completion signal transmits the notification instruction signal to the notification system 30 of the vehicle 3. However, the present disclosure is not limited to this, and for example, the server 1 that has received the conveyance preparation completion signal may notify the terminal 2 of this and transmit a notification instruction signal from the terminal 2 to the notification system 30 of the vehicle 3.

Figure 10:
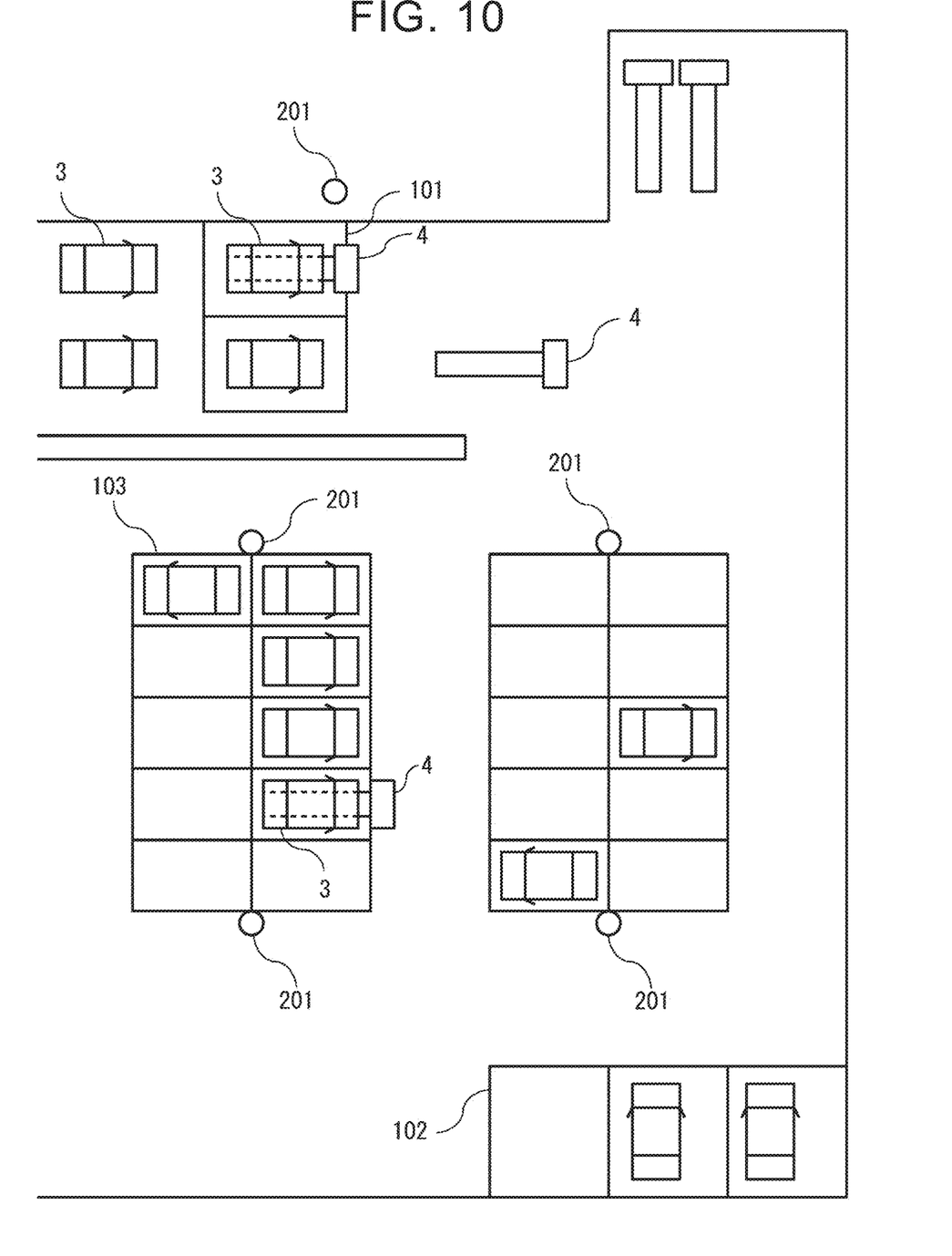
FIG. 10 is a diagram illustrating an example in which a notification system is installed in an infrastructure.

In the present embodiment, the notification system 30 is mounted on the vehicle 3. However, the present disclosure is not limited thereto, and for example, as shown in FIG. 10, the notification system 30 may be mounted at a point where the conveyance work for the vehicle 3 is performed. That is, the notification system 30 may be mounted in an infrastructure facility 201 such as a smart pole installed in the vicinity of the warehousing space 101 or the parking space 103. At the time of the conveyance operation, the notification system 30 mounted on the nearest infrastructure facility 201 of the conveyance target vehicle 3 may notify the surroundings (persons outside the vehicle) that the conveyance operation for the conveyance target vehicle 3 is performed by a third party who has obtained permission.

The notification system 30 according to the present embodiment described above is configured to be capable of communicating with the server 1 (external). The notification system 30 is configured to notify the surroundings of the fact that the conveyance work is performed by a third party who has obtained permission when the vehicle 3 is conveyed by the autonomously travelable vehicle transportation device 4 based on the notification instruction from the server 1.

As a result, when the vehicle 3 is transported by the vehicle transportation device 4, it is notified to the surroundings that the transporting operation is performed by a third party who has obtained permission. Therefore, it is possible to suppress the surprise of a surrounding person by the conveyance operation. In addition, it is possible to suppress suspiciousness of the conveyance operation to the surrounding person.

In particular, in the present embodiment, the notification system 30 is mounted on the vehicle 3 instead of the vehicle transportation device 4. When the notification is performed by the vehicle transportation device 4, it cannot be denied that a malicious third party such as a vehicle theft is performing the notification by the vehicle transportation device 4 in order to deceive a surrounding person. However, in the present embodiment, the transported vehicle 3 itself (the notification system 30 mounted on the vehicle 3) performs notification. Therefore, it is possible for the surrounding person to easily determine that the conveyance of the vehicle 3 by the vehicle transportation device 4 is performed by a third party who has obtained the permission of the owner of the vehicle 3. In a case where the notification system 30 is mounted on the infrastructure facility 201 in the vicinity of the conveyance work point of the vehicle 3, the same operation and effect can be obtained.

The vehicle transportation system 100 according to the present embodiment includes a terminal 2 associated with the vehicle 3, a vehicle transportation device 4 that transports the vehicle 3 by autonomous travel, a notification system 30 that performs notification to the surroundings, and a server 1 that communicates with each of the terminal 2, the vehicle transportation device 4, and the notification system 30.

Then, when the server 1 receives, from the vehicle transportation device 4, a conveyance preparation completion signal indicating that preparation for starting the conveyance work of the vehicle 3 is completed, the server 1 is configured to transmit, to the notification system 30, a notification instruction signal for instructing the surroundings to notify that the conveyance work of the vehicle 3 by the vehicle transportation device 4 is performed by a third party who has obtained permission.

When the server 1 receives a transport request for the vehicle 3 from the terminal 2, the server 1 is configured to transmit a transport instruction for the vehicle 3 to the vehicle transportation device 4. The vehicle transportation device 4 is configured to move toward the vehicle 3 when receiving the conveyance instruction, and transmit a conveyance preparation completion signal to the server 1 when the vehicle 3 is found.

As a result, when the vehicle 3 is transported by the vehicle transportation device 4, it is notified to the surroundings that the transporting operation is performed by a third party who has obtained permission. Therefore, it is possible to suppress the surprise of a surrounding person by the conveyance operation. In addition, it is possible to suppress suspiciousness of the conveyance operation to the surrounding person.

Embodiments of the present disclosure have been described above. The above-described embodiments are merely a part of application examples of the present disclosure, and the technical scope of the present disclosure is not intended to be limited to the specific configurations of the above-described embodiments.

For example, in the above-described embodiment, the computer program executed in the notification control device 33 of the notification system 30 may be provided in a form recorded in a computer-readable portable recording medium such as a semiconductor memory, a magnetic recording medium, or an optical recording medium.

What is claimed is:

1. A notification system communicable with an outside, the notification system comprising:
   a notification device including at least one of a lamp, a speaker, or a display, the at least one of the lamp, the speaker, or the display being configured to, based on a notification instruction from the outside, notify surroundings that a transportation work of a vehicle is performed by a third party who has obtained permission, when the transportation work is performed by a vehicle transportation device able to perform autonomous traveling,
   wherein the notification device is mounted on an infrastructure facility in a vicinity of the vehicle or a transportation work point of the vehicle.

2. The notification system according to claim 1, further comprising:
   a terminal configured to communicate with the outside; and
   a processor configured to cause the notification device to perform notification when the notification instruction is received from the outside via the terminal, wherein the at least one of the lamp, the speaker, or the display is configured to perform the notification to the surroundings by light, sound, an image, or a combination of the light, the sound, and the image.

3. A vehicle transportation system, comprising:
   a terminal associated with a vehicle;
   a vehicle transportation device that is configured to transport the vehicle by autonomous traveling;
   a notification system including at least one of a lamp, a speaker, or a display, the at least one of the lamp, the speaker, or the display being configured to perform notification to surroundings; and
   a server configured to
      communicate with each of the terminal, the vehicle transportation device, and the notification system, and
      transmit a notification instruction signal to the notification system when the server receives, from the vehicle transportation device, a transportation preparation completion signal indicating that preparation for starting a transportation work of the vehicle is completed, the notification instruction signal being a signal for instructing to notify the surroundings that the transportation work of the vehicle by the vehicle transportation device is performed by a third party who has obtained permission,
   wherein the notification system is mounted on an infrastructure facility in a vicinity of the vehicle or a transportation work point of the vehicle.

4. The vehicle transportation system according to claim 3, wherein:
   the server is configured to transmit a transportation instruction of the vehicle to the vehicle transportation device when the server receives a transportation request of the vehicle from the terminal; and
   the vehicle transportation device is configured to
      move toward the vehicle when the vehicle transportation device receives the transportation instruction, and
      transmit the transportation preparation completion signal to the server when the vehicle is found.

5. The vehicle transportation system according to claim 3, wherein the notification system includes:
   a terminal configured to communicate with the server,
   the at least one of the lamp, the speaker, or the display configured to perform the notification to the surroundings by light, sound, an image, or a combination of the light, the sound, and the image, and
   a processor configured to cause the at least one of the lamp, the speaker, or the display to perform the notification when the notification system receives the notification instruction signal from the server via the terminal.

6. A non-transitory storage medium that stores a computer program for causing, when executed by a notification system, the notification system to execute:
   communicating with an outside; and
   performing notification to surroundings, based on a notification instruction from the outside, that a transportation work of a vehicle is performed by a third party who has obtained permission, when the transportation work is performed by a vehicle transportation device able to perform autonomous traveling,
   wherein the notification system is mounted on an infrastructure facility in a vicinity of the vehicle or a transportation work point of the vehicle.

* * * * *